(12) United States Patent
Harasyn et al.

(10) Patent No.: US 7,334,484 B2
(45) Date of Patent: Feb. 26, 2008

(54) LINE PRESSURE MEASUREMENT USING DIFFERENTIAL PRESSURE SENSOR

(75) Inventors: Donald E. Harasyn, Eden Prairie, MN (US); Charles R. Willcox, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/140,681

(22) Filed: May 27, 2005

(65) Prior Publication Data
US 2006/0278007 A1 Dec. 14, 2006

(51) Int. Cl.
*G01L 9/12* (2006.01)
(52) U.S. Cl. ............... 73/718; 73/724; 73/723
(58) Field of Classification Search ............... 73/717, 73/724, 723, 718
See application file for complete search history.

(56) References Cited

U.S. PATENT DOCUMENTS

| | | | |
|---|---|---|---|
| 2,533,339 A | 12/1950 | Willenborg | 177/311 |
| 3,012,432 A | 12/1961 | Moore et al. | 73/40 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,557,621 A | 1/1971 | Ferran | 73/398 |
| 3,697,835 A | 10/1972 | Satori | 317/246 |
| 3,808,480 A | 4/1974 | Johnston | 317/256 |
| 3,924,219 A | 12/1975 | Braun | 338/34 |
| 4,008,619 A | 2/1977 | Alcaide et al. | 73/398 |
| 4,120,206 A * | 10/1978 | Rud, Jr. | 73/718 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,244,226 A | 1/1981 | Green et al. | 73/703 |

(Continued)

FOREIGN PATENT DOCUMENTS

DE 3340834 A1 5/1985

(Continued)

OTHER PUBLICATIONS

Notification of Transmittal of the International Search Report and the Written Opinion of the International Searching Authority, or the Declaration of PCT/US2006/020254.

*Primary Examiner*—Andre J. Allen
(74) *Attorney, Agent, or Firm*—Westman, Champlin & Kelly, P.A.

(57) ABSTRACT

A pressure sensor assembly for sensing a pressure of a process fluid includes a sensor body having a cavity formed therein to couple to a process fluid pressure. A deflectable diaphragm in the cavity deflects in response to the first and second process fluid pressures. A first primary electrode couples to a wall of the cavity and forms a first primary capacitor between the first primary electrode and the deflectable diaphragm. A first secondary electrode couples to the wall of the cavity to form a first secondary capacitor between the first secondary electrode and the deflectable diaphragm. A second primary electrode and second secondary electrode are preferably coupled to a wall of the cavity opposite the first. Line pressure of the process fluid is determined based upon variation in the secondary capacitors relative to the primary capacitors.

25 Claims, 8 Drawing Sheets

U.S. PATENT DOCUMENTS

| | | | |
|---|---|---|---|
| 4,287,553 A | 9/1981 | Braunlich | 361/283 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,370,890 A | 2/1983 | Frick | 73/718 |
| 4,389,895 A | 6/1983 | Rud, Jr. | 73/724 |
| 4,422,125 A | 12/1983 | Antonazzi et al. | 361/283 |
| 4,422,335 A | 12/1983 | Ohnesorge et al. | 73/724 |
| 4,434,451 A | 2/1984 | Delatorre | 361/283 |
| 4,455,874 A | 6/1984 | Paros | 73/704 |
| 4,458,537 A | 7/1984 | Bell et al. | 73/718 |
| 4,466,290 A | 8/1984 | Frick | 73/756 |
| 4,490,773 A | 12/1984 | Moffatt | 361/283 |
| 4,542,436 A | 9/1985 | Carusillo | 361/283 |
| 4,562,742 A | 1/1986 | Bell | 73/718 |
| 4,586,108 A * | 4/1986 | Frick | 361/283.3 |
| 4,670,733 A | 6/1987 | Bell | 338/36 |
| 4,785,669 A | 11/1988 | Benson et al. | 73/718 |
| 4,860,232 A | 8/1989 | Lee et al. | 364/571.04 |
| 4,875,369 A | 10/1989 | Delatorre | 73/151 |
| 4,878,012 A | 10/1989 | Schulte et al. | 324/60 |
| 4,926,674 A | 5/1990 | Fossum et al. | 73/4 |
| 4,951,174 A | 8/1990 | Grantham et al. | 361/283.1 |
| 4,977,480 A | 12/1990 | Nishihara | 73/724 |
| 5,094,109 A | 3/1992 | Dean et al. | 73/718 |
| 5,168,419 A | 12/1992 | Delatorre | 361/283 |
| 5,194,819 A | 3/1993 | Briefer | 73/718 |
| 5,230,250 A | 7/1993 | Delatorre | 73/733 |
| 5,233,875 A | 8/1993 | Obermeier et al. | 73/718 |
| 5,329,818 A | 7/1994 | Frick et al. | 73/708 |
| 5,469,749 A | 11/1995 | Shimada et al. | 73/861.47 |
| 5,492,016 A | 2/1996 | Pinto et al. | 73/724 |
| 5,524,492 A * | 6/1996 | Frick et al. | 73/706 |
| 5,542,300 A | 8/1996 | Lee | 73/724 |
| 5,637,802 A | 6/1997 | Frick et al. | 73/724 |
| 5,642,301 A | 6/1997 | Warrior et al. | 364/571.02 |
| 5,705,978 A | 1/1998 | Frick et al. | 340/511 |
| 5,757,608 A | 5/1998 | Bernot et al. | 361/283.4 |
| 5,760,310 A | 6/1998 | Rud et al. | 73/706 |
| 5,911,162 A | 6/1999 | Denner | 73/718 |
| 5,920,016 A * | 7/1999 | Broden | 73/756 |
| 5,992,240 A | 11/1999 | Tsuruoka et al. | 73/718 |
| 6,295,875 B1 | 10/2001 | Frick et al. | 73/718 |
| 6,484,585 B1 | 11/2002 | Sittler et al. | 73/718 |
| 6,520,020 B1 | 2/2003 | Lutz et al. | 73/706 |
| 6,654,697 B1 | 11/2003 | Eryurek et al. | 702/47 |
| 6,662,662 B1 * | 12/2003 | Nord et al. | 73/715 |
| 6,675,655 B2 * | 1/2004 | Broden et al. | 73/716 |
| 6,701,274 B1 | 3/2004 | Eryurek et al. | 702/140 |
| 2002/0178827 A1* | 12/2002 | Wang | 73/718 |
| 2004/0015069 A1 | 1/2004 | Brown | 600/407 |
| 2004/0168523 A1 | 9/2004 | Fernald et al. | 73/861.01 |
| 2005/0005712 A1 | 1/2005 | Gysling et al. | 73/861.23 |
| 2005/0011278 A1 | 1/2005 | Brown et al. | 73/861.18 |
| 2005/0132808 A1 | 6/2005 | Brown et al. | 73/592 |
| 2006/0206288 A1 | 9/2006 | Brahmajosyula et al. | 702/183 |
| 2006/0278005 A1 | 12/2006 | Broden et al. | 73/716 |
| 2006/0278007 A1 | 12/2006 | Harasyn et al. | 73/723 |

FOREIGN PATENT DOCUMENTS

| | | |
|---|---|---|
| EP | 0 524 550 A1 | 1/1993 |
| WO | WO 99/53286 | 10/1999 |

* cited by examiner

US 7,334,484 B2

LINE PRESSURE MEASUREMENT USING DIFFERENTIAL PRESSURE SENSOR

BACKGROUND OF THE INVENTION

The present invention relates to pressure sensors of the type used to measure the pressure of a process fluid. More specifically, the present invention relates to a pressure sensor configured to measure both a differential pressure as well as a line pressure.

Transmitters are used in process monitoring and control systems to measure various process variables of industrial processes. One type of transmitter measures pressure of process fluid in the process. Various techniques have been used in the pressure sensors used in such transmitters. One well known technique is to use a deflectable diaphragm. A capacitance is measured with respect to the diaphragm, with the diaphragm forming one of the capacitive plates of the capacitor. As the diaphragm is deflected due to applied pressure, the measured capacitance changes. In such a configuration, there are a number of sources of inaccuracies in pressure measurements.

One technique which addresses these inaccuracies is set forth in U.S. Pat. No. 6,295,875 entitled, "PROCESS PRESSURE MEASUREMENT DEVICES WITH IMPROVED ERROR COMPENSATION" issued Oct. 2, 2001 to Frick et al. which is incorporated herein by reference in its entirety. This patent describes a differential pressure sensor that includes an additional electrode for use in reducing measurement inaccuracies. However, in some installations it is desirable to measure an absolute (line or gauge) pressure in addition to a differential pressure measurement. In such an application, an additional pressure sensor is typically required to measure the line pressure.

SUMMARY

A pressure sensor assembly for sensing a pressure of a process fluid includes a sensor body having a cavity formed therein. The cavity is configured to couple to a first process fluid pressure. A deflectable diaphragm in the cavity deflects in response to the first process fluid pressure. A first primary electrode is coupled to a wall of the cavity and forms a first primary capacitor between the first primary electrode and the deflectable diaphragm. A first secondary electrode is coupled to the wall of the cavity to form a first secondary capacitor between the first secondary electrode and the deflectable diaphragm. Line pressure of the process fluid is calculated as a function of variation in the first primary capacitor and the first secondary capacitor due to changes in the size of the cavity from the first process fluid pressure. A method is also provided.

DETAILED DESCRIPTION

The present invention provides an apparatus and method for determining line pressure for a multi-electrode capacitance-based pressure sensor. By computing the ratios of sums, or sums of ratios, of appropriate capacitances in a multi-capacitance based pressure sensor, the line pressure of the process fluid can be determined.

Figure 1:
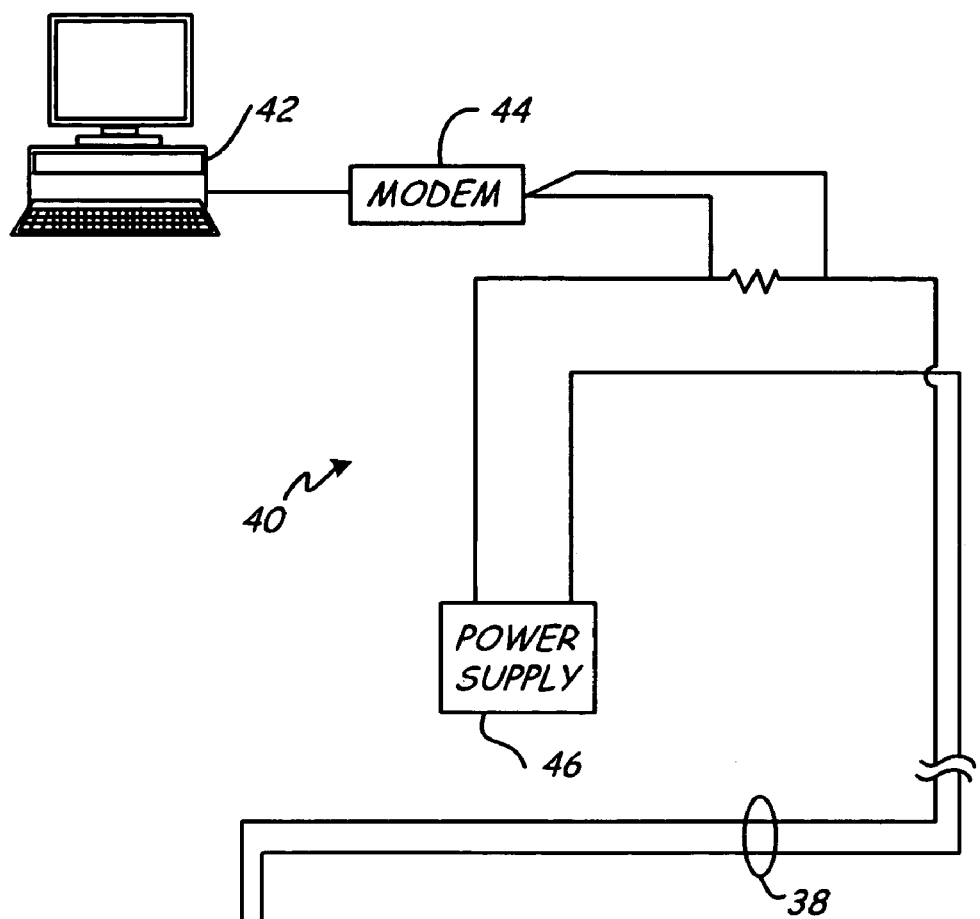
FIG. 1 shows a process measurement system with a process transmitter constructed in accordance with the present invention.
Figure 1:
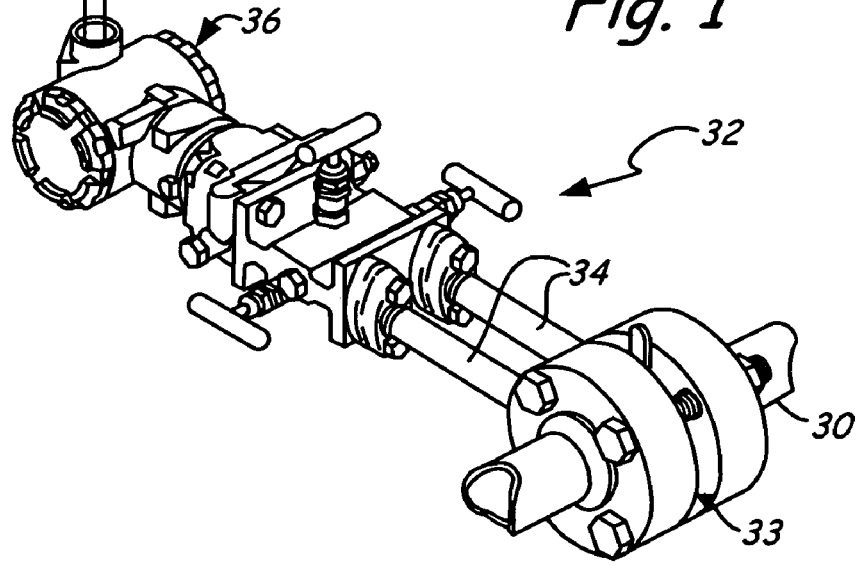

FIG. 1 shows generally the environment of a process measurement system 32. FIG. 1 shows process piping 30 containing a fluid under pressure coupled to the process measurement system 32 for measuring a process pressure. The process measurement system 32 includes impulse piping 34 connected to the piping 30. The impulse piping 34 is connected to a process pressure transmitter 36. A primary element 33, such as an orifice plate, venturi tube, flow nozzle, and so on, contacts the process fluid at a location in the process piping 30 between the pipes of the impulse piping 34. The primary element 33 causes a pressure change in the fluid as it passes past the primary element 33.

Transmitter 36 is a process measurement device that receives process pressures through the impulse piping 34. The transmitter 36 senses a differential process pressure and converts it to a standardized transmission signal that is a function of the process pressure.

A process loop 38 provides both a power signal to the transmitter 36 from control room 40 and bidirectional communication, and can be constructed in accordance with a number of process communication protocols. In the illustrated example, the process loop 38 is a two-wire loop. The two-wire loop is used to transmit all power to and all communications to and from the transmitter 36 during normal operations with a 4-20 mA signal. A computer 42 or other information handling system through modem 44, or other network interface, is used for communication with the transmitter 36. A remote voltage power supply 46 powers the transmitter 36.

Figure 2:
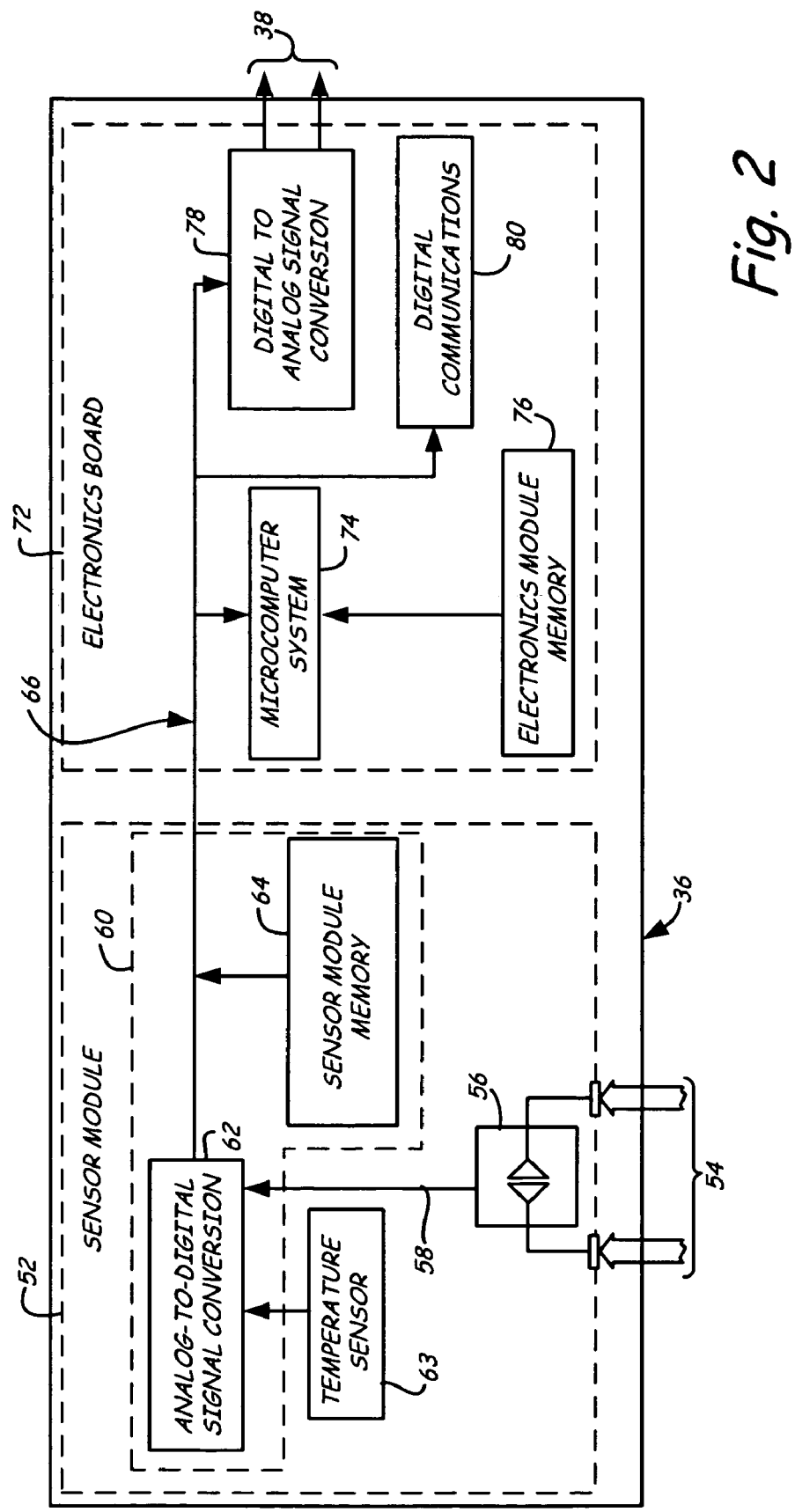
FIG. 2 is schematic view of a transmitter of FIG. 1.

FIG. 2 is a simplified block diagram of pressure transmitter 36. Pressure transmitter 36 includes a sensor module 52 and an electronics board 72 coupled together through a databus 66. Sensor module electronics 60 couples to pressure sensor 56 which received an applied differential pressure 54. The data connection 58 couples sensor 56 to an analog to digital converter 62. An optional temperature sensor 63 is also illustrated along with sensor module memory 64. The electronics board 72 includes a microcomputer system 74, electronics memory module 76, digital to analog signal conversion 78 and digital communication block 80.

In accordance with techniques set forth in U.S. Pat. No. 6,295,875 to Frick et al., pressure transmitter 36 senses differential pressure. However, the present invention is not limited to such a configuration.

Figure 3:
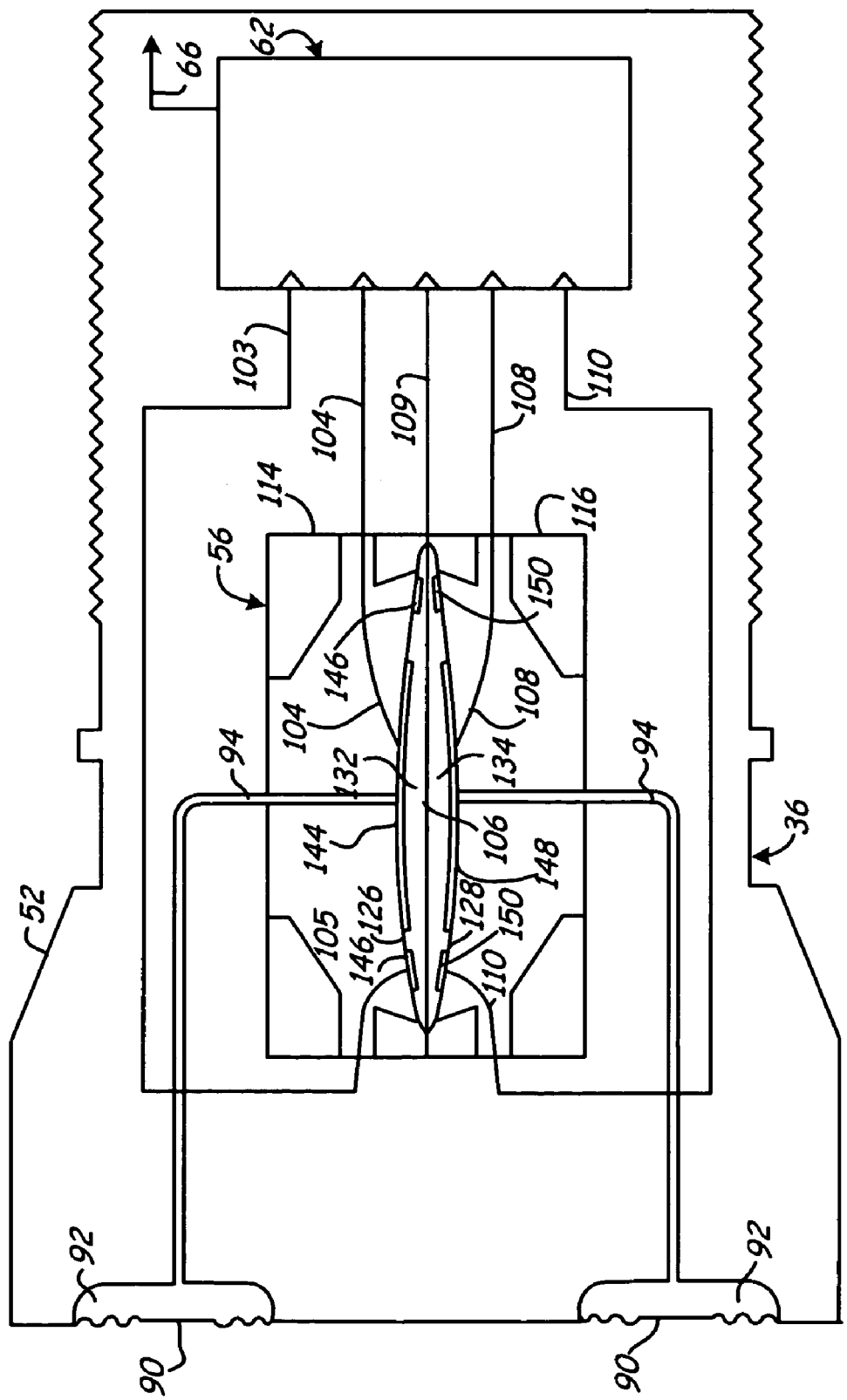
FIG. 3 shows a cross sectional view of a portion of the process transmitter of FIG. 1.

FIG. 3 is a simplified cross-sectional view of one embodiment of a sensor module 52 showing pressure sensor 56. Pressure sensor 56 couples to a process fluid through isolation diaphragms 90 which isolate the process fluid from cavities 92. Cavities 92 couple to the pressure sensor module 56 through impulse piping 94. A substantially incompressible fill fluid fills cavities 92 and impulse piping 94. When a pressure from the process fluid is applied to diaphragms 90, it is transferred to the pressure sensor 56.

Pressure sensor 56 is formed from two pressure sensor halves 114 and 116 and filled with a preferably brittle, substantially incompressible material 105. A diaphragm 106 is suspended within a cavity 132,134 formed within the sensor 56. An outer wall of the cavity 132, 134 carries electrodes 146,144,148 and 150. These can, generally, be referred to as primary electrodes 144 and 148, and secondary or secondary electrodes 146 and 150. These electrodes form capacitors with respect to the moveable diaphragm 106. The capacitors, again, can be referred to as primary and secondary capacitors.

As illustrated in FIG. 3, the various electrodes in sensor 56 are coupled to analog to digital converter 62 over electrical connection 103, 104, 108 and 110. Additionally, the deflectable diaphragm 106 couples to analog to digital converter 62 through connection 109.

As discussed in U.S. Pat. No. 6,295,875, the differential pressure applied to the sensor 56 can be measured using the electrodes 144-150. As discussed below, the capacitance measured using these electrodes can also be used to determine the line pressure of the process fluid applied to the pressure sensor 56.

Figure 4:
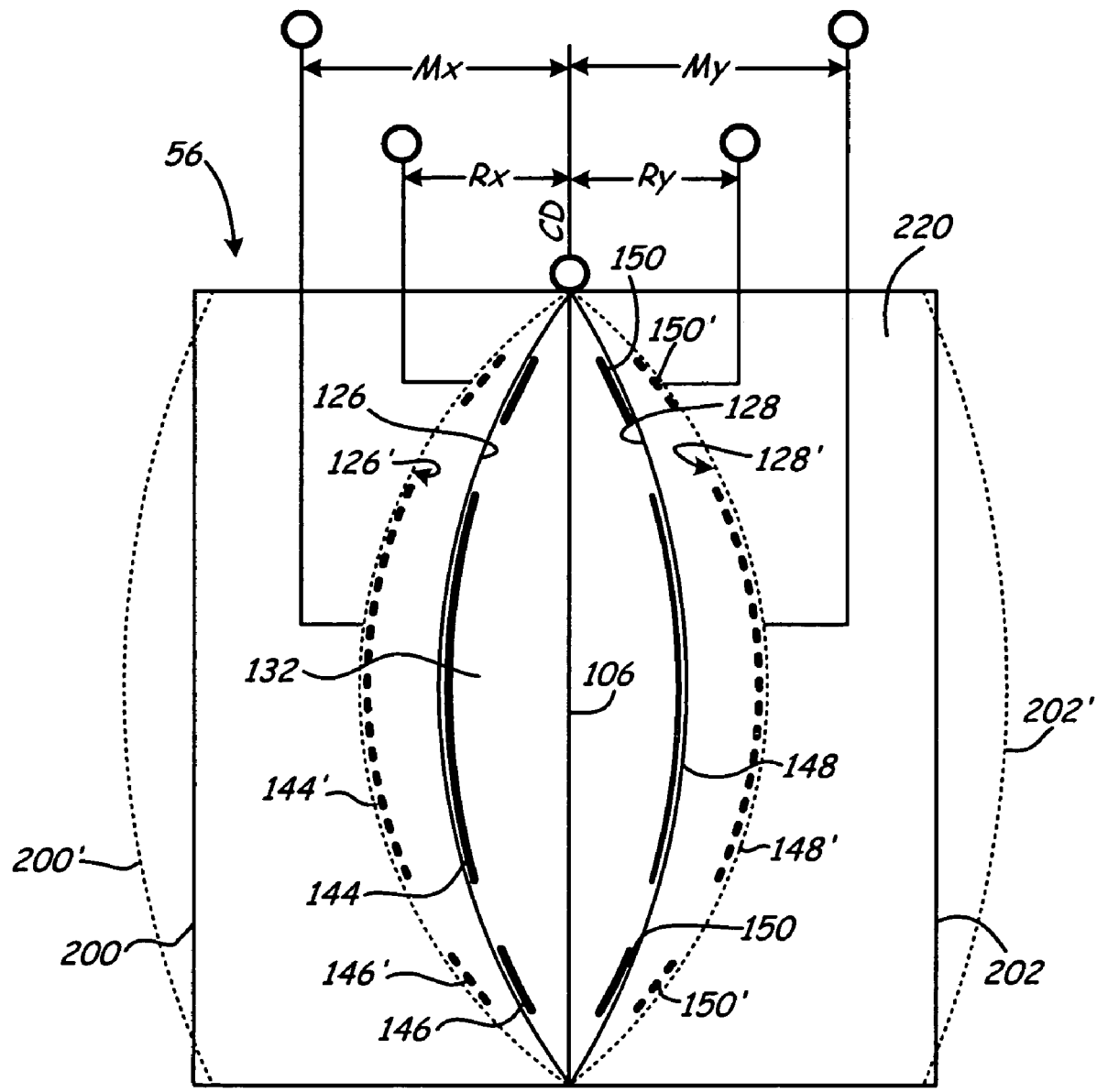
FIG. 4 is a simplified cross sectional view of pressure sensor 56 for use in illustrating operation of the present invention.

FIG. 4 is a simplified cross-sectional view of sensor 56 used to illustrate operation of the present invention. FIG. 4 illustrates various capacitive values, $M_X$ between electrode 144 and diaphragm 106, $M_Y$ between electrode 148 and diaphragm 106, $R_X$ between electrode 146 and diaphragm 106 and capacitor $R_Y$ between electrode 150 and diaphragm 106.

It has been discovered that during an operation of pressure sensor 56, the line pressure applied to the pressure sensor through the capillary tubes 94 causes a deformation in the body 220 of pressure sensor 56. The applied line pressure causes a pressure difference between the pressure within body 220 and the internal environment of the pressure transmitter. This pressure differential causes the deformation in the body 220. In the example shown in FIG. 4, a greatly exaggerated deformation is shown. Specifically, the applied line pressure causes exterior walls 200 and 202 of body 220 to expand outward to the positions shown in phantom at 200' and 202'. As the body deforms, the interior walls 126 and 128 of cavity 132, 134 also expand outward to the position shown in phantom 126' and 128', respectively. As the walls 126 and 128 move outwardly, the electrodes 144, 146, 148 and 150 also move in an outwardly position as illustrated in phantom at 144', 146', 148' and 150', respectively. This change in position of the electrodes 144, 146, 148 and 150 results in a change in the capacitance values as measured at $M_X$, $M_Y$, $R_X$ and $R_Y$. In accordance with the present invention, this change in capacitance is used to measure the line pressure applied to the pressure sensor 56.

As used herein, the capacitance between electrodes 144 and 148 and the diaphragm 106 is referred to as a "primary capacitance" and the capacitance between electrodes 146 and 150 and the center diaphragm 106 is referred to as a secondary capacitance. In accordance with the present invention, the line pressure is determined as a function of the capacitance of a primary capacitor and the capacitance of a secondary capacitor. These capacitance values can be used in a ratio of sums, or sum of ratios, in a configuration to reduce errors in the line pressure measurements.

A line pressure (P) signal can be derived from the multielectrode capacitance based differential pressure sensor 56 described above. This determination can be made by computing a ratio of sums, or a sum of ratios of the appropriate inverse active capacitance signals. As used herein, active capacitance is that capacitance which responds to movement of the center diaphragm (CD) relative to the sensor cavity and excludes any stray capacitance. The inverse of active capacitance is proportional to the separation or gap between the two large area (primary) electrodes separated by a relatively small distance. The configuration illustrated above with a center primary electrode and the ring secondary electrodes can be used to determine line pressure when the inverse active ring capacitances are divided by the inverse active primary capacitances. More specifically, line pressure can be determined as follows:

$$LP=k*(1/Rx+1/Ry)/(1/Mx+1/My) \quad \text{EQ. 1}$$

A different, equally useful formulation can be written as follows:

$$LP=j*(1/Rx)/(1/Mx)+(1/Ry)/(1/My)=j*(Mx/Rx+My/Ry) \quad \text{EQ. 2}$$

Where M is the active capacitance of the primary electrode, R is the active capacitance of the ring electrode, x and y refer to the low and high sides of the differential pressure sensor as illustrated in FIG. 4. The constants k and j are proportionality constants. Line pressure can also be determined using a single active capacitance value. However, in such a configuration, the capacitance is particularly sensitive to errors, for example, due to temperature variations. In contrast, using the ratios discussed above, a much greater signal to noise ratio can be obtained, for example a factor 100 improvement over the use of single active capacitance.

Figure 5A:
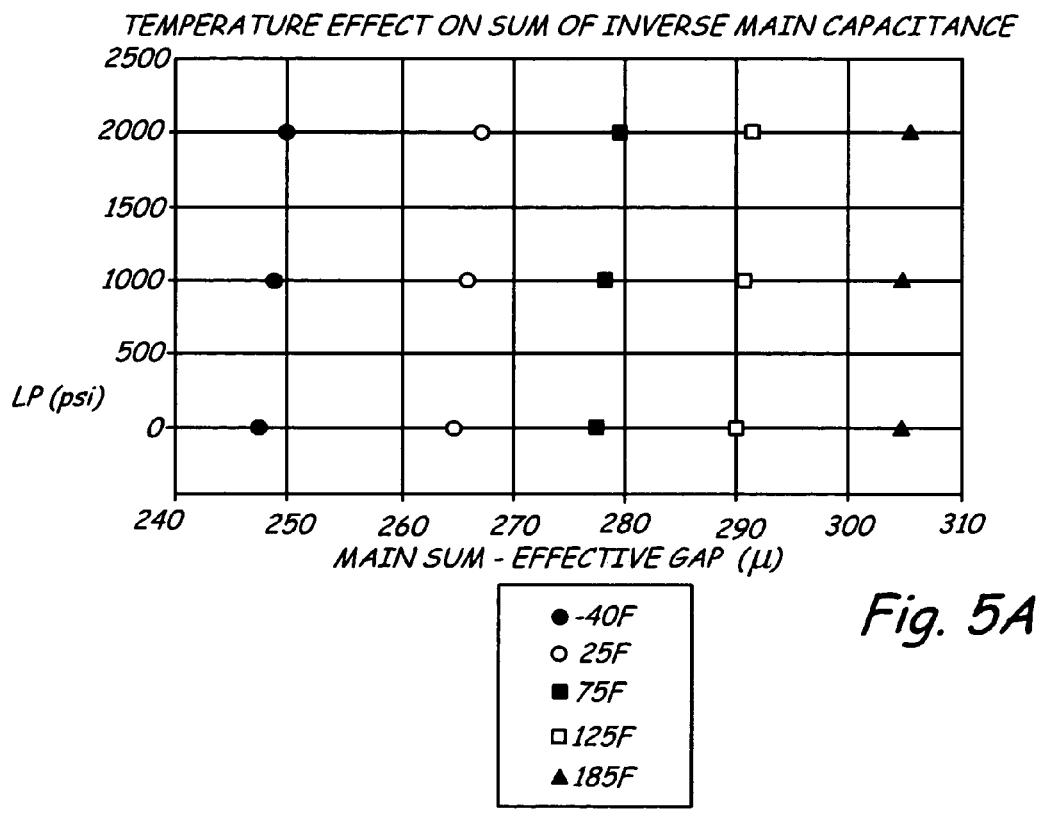
FIG. 5A is a graph of line pressure versus primary sum effective gap and FIG. 5B is a graph of line pressure versus ring sum effective gap.
Figure 5B:
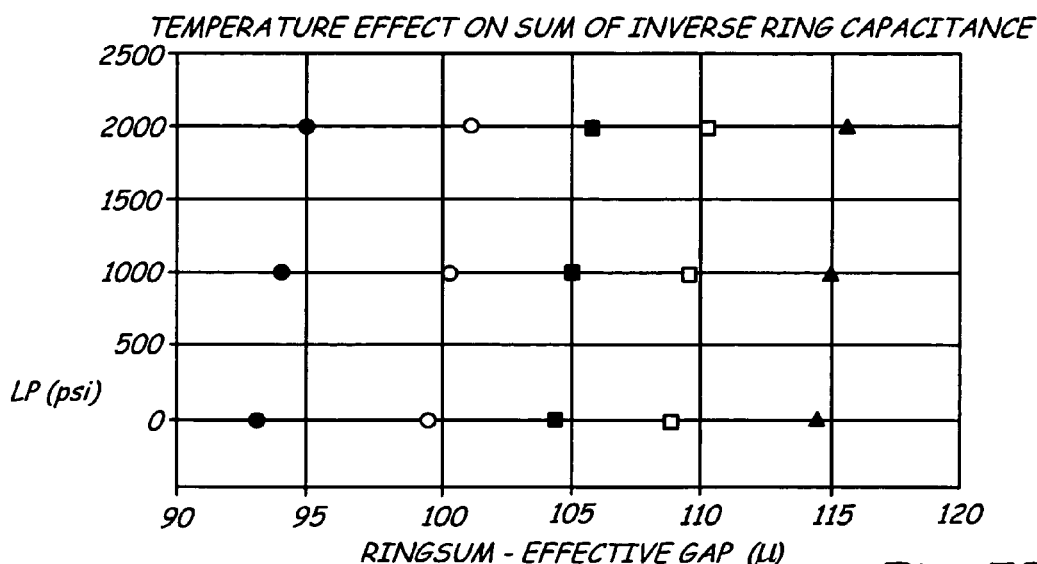
Figure 6A:
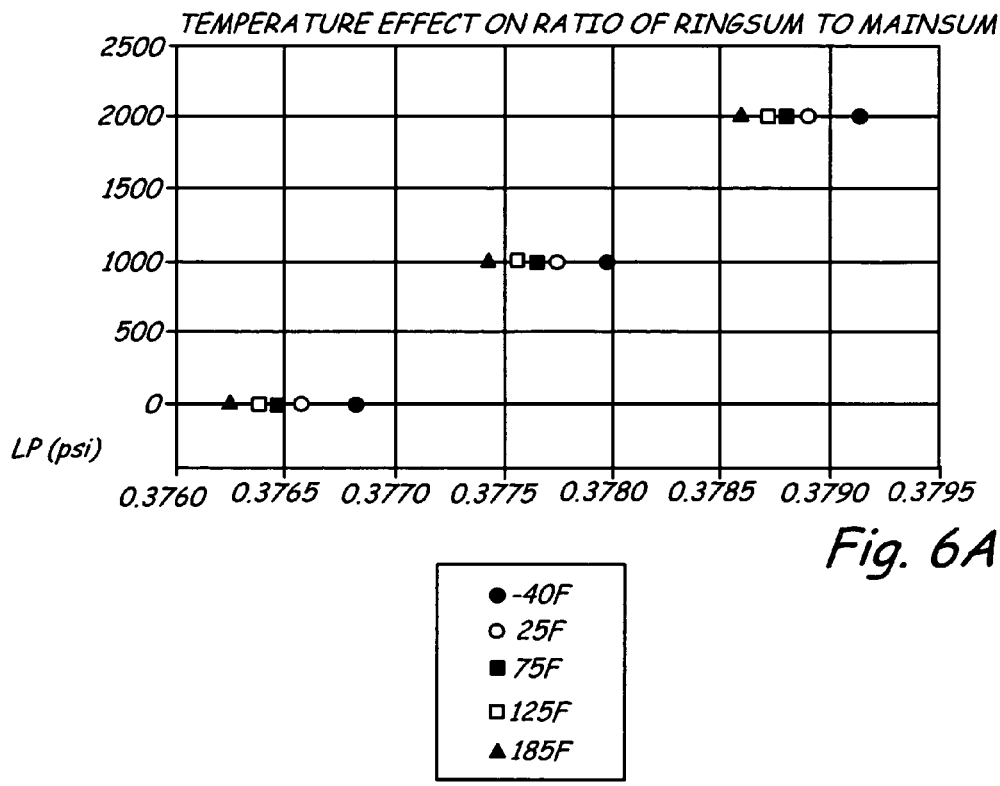
FIGS. 6A and 6B are graphs of line pressure versus ring sum/primary sum and (ring gap/primary gap)$_X$+(ring gap/primary gap)$_Y$.
Figure 6B:
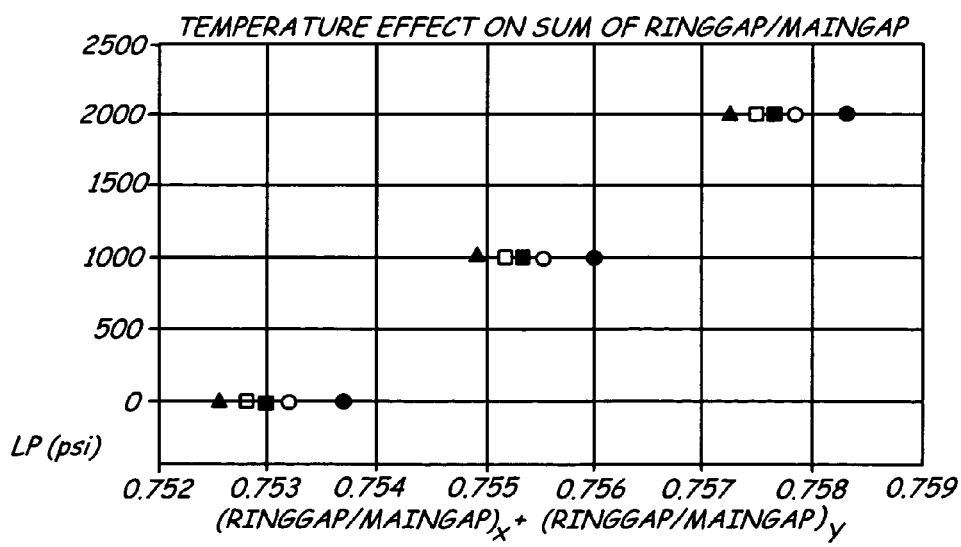

FIG. 5A is a graph of line pressure (PSI) versus primary sum-effective gap (μm) showing the temperature effect on the sum of the gaps between the primary electrodes 144, 148 and the diaphragm 106 utilizing inverse capacitance. FIG. 5B is a similar graph utilizing inverse ring capacitance. As illustrated in FIGS. 5A and 5B, measuring the line pressure with inverse capacitance provides a very steep slope or low gauge factor with large changes in apparent line pressure (y-intercept) for small changes in temperature. FIG. 6A is a graph of line pressure versus ring sum/primary sum in accordance with equation 1 at various temperatures and FIG. 6B is a graph of line pressure versus (ring gap/primary gap)$_X$+(ring gap/primary gap)$_Y$ in accordance with equation 2. As illustrated in FIGS. 6A and 6B, and in contrast to the graphs FIGS. 5A and 5B, the slope of the LP signal is greatly reduced (higher gauge factor) and the y-intercept offsets caused by temperature are small relative to the LP span. The raw temperature error in FIGS. 6A and 6B is similar to comparable sensors and is at least partially correctable. In the graphs of FIGS. 5A, 5B, 6A and 6B, the data was collected at a differential pressure of 0.

A line pressure signal can also be obtained when the differential pressure and line pressure are superimposed by combining either of the ratios illustrated in equations 1 or 2 with a standard differential pressure transfer function. In the case of equation 1, such a combination results in a fit of the data to a surface in three dimensional space with line pressure being a function of a ratio from equation 1 and the standard transfer function $$\frac{(Mx - My)}{(Mx + My)}.$$

Figure 7A:
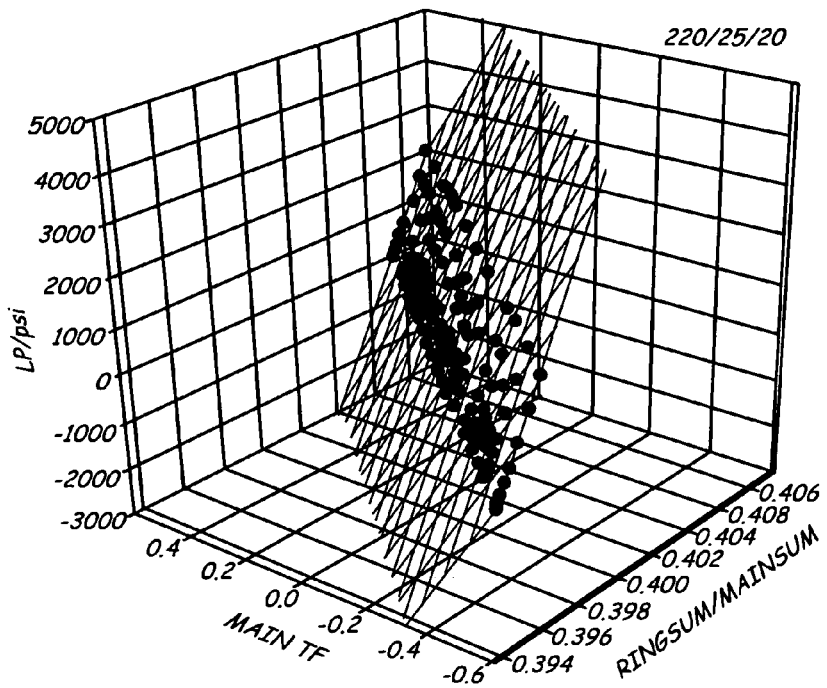
FIGS. 7A and 7B are three dimensional graphs of line pressure versus primary transfer function versus ring sum/primary sum.
Figure 7B:
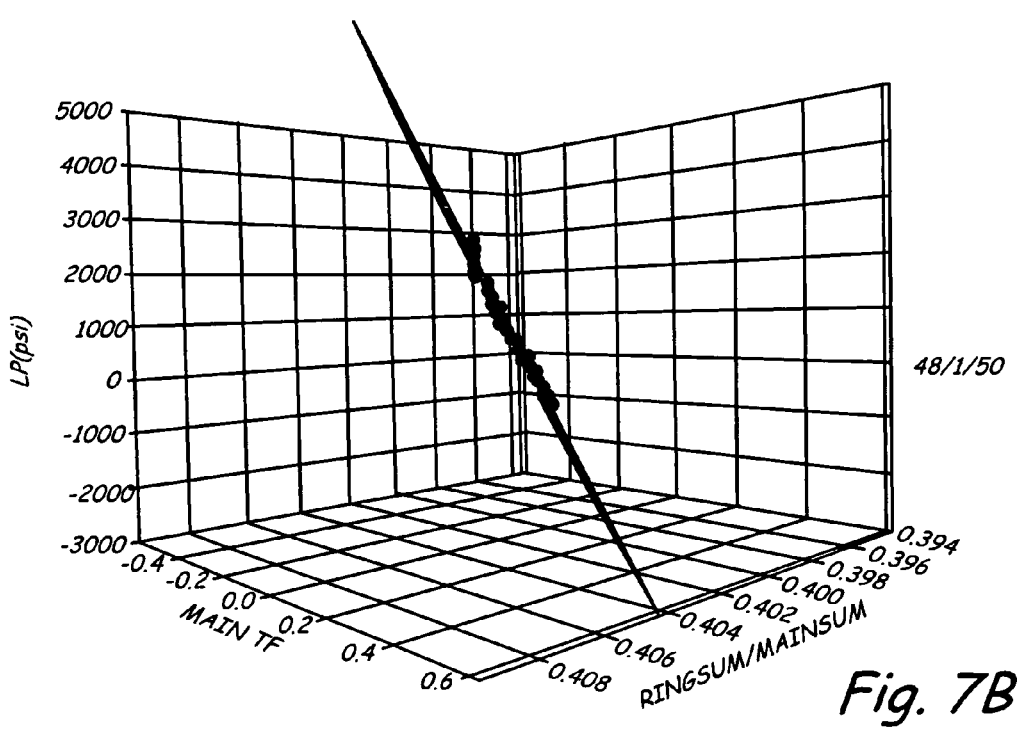

For example, FIGS. 7A and 7B are the views of a graph of line pressure versus primary transfer function versus ring sum/primary sum. In this example, 192 data points are fitted based upon using a standard pressure transmitter at various line pressure and differential pressure values. The reorientation of the axes in FIG. 7B illustrates the close fit of the data into a plane.

Figure 8A:
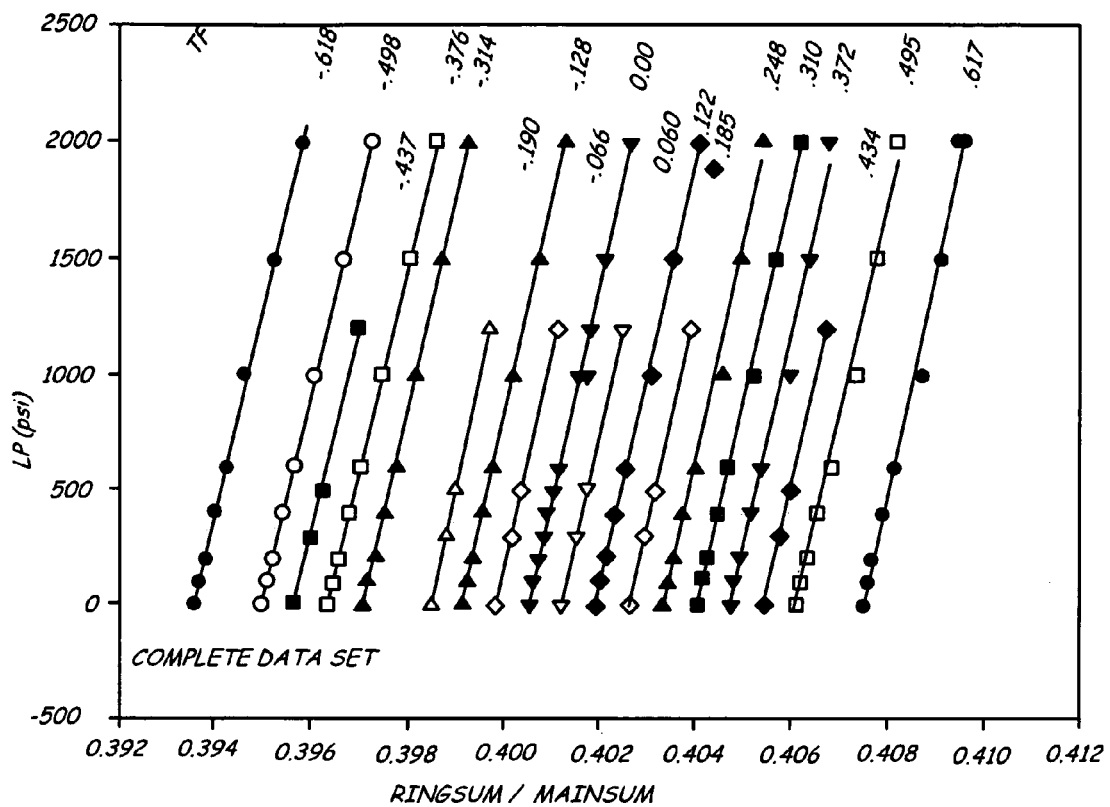
FIG. 8A is a graph of line pressure versus ring sum/primary sum at various transfer function values.
Figure 8B:
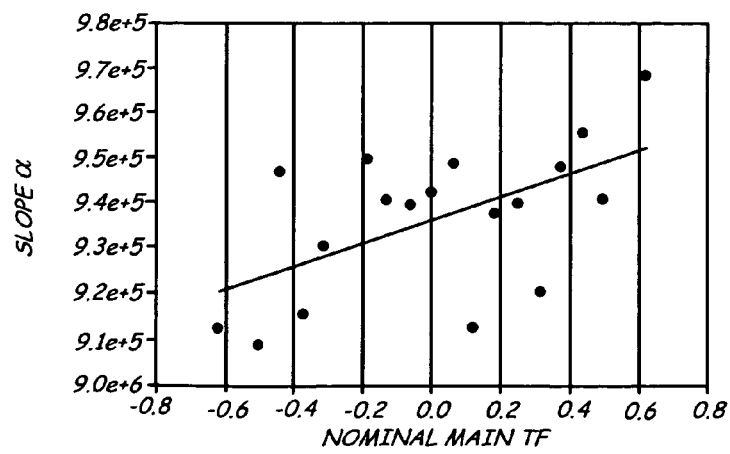
FIG. 8B is a graph of slope ' versus nominal primary transfer function.

FIG. 8A is a graph of the data from FIGS. 7A, 7B of line pressure versus ring sum/primary sum. FIG. 8B is a graph of the slope of each line in FIG. 8A versus nominal primary TF. As illustrated in these figures, the data is easily segregated with great consistency by the transfer function. The plot in FIG. 8B illustrates that there is no higher order effect that warps or twists the plane and confirms the simplicity of the ratio/transfer function/line pressure relationship.

With the present invention, the instability of the dielectric constant of the fill fluid caused by heating, cooling, compression, decompression and transients cancels out to a relatively large degree. This is achieved by using more than one electrode on either side of the diaphragm in the pressure cell to obtain the line pressure signal.

In specific experiments, the precision of the data provides an error band of +1-70 PSI line pressure at a 95% confidence level. This level of precision is sufficient for reducing zero and span line pressure errors by a factor of 10 over a standard configuration by correcting the differential pressure transmitter output based upon the line-pressure signal. Manipulation of the capacitance data alone provides this improvement and no additional line-pressure sensor is required. Further, the present invention can be used to extract a useable line pressure signal based upon the measured capacitance values, again without the use of an additional line pressure sensor. In more advanced configurations, the line pressure signal can be used in combination with differential pressure and, in some configurations, combined with temperature to provide a mass flow calculation.

In one example, the capacitance of the primary capacitor changes by about 0.2% as the line pressure changes from 0 to 2000 PSI. Similarly, the capacitance of the ring capacitor changes by about 0.7% over such a range. The change in capacitance is substantially linearly relative to the change in applied line pressure. The two capacitances are used to accurately measure the applied line pressure.

Although the present invention has been described with reference to preferred embodiments, workers skilled in the art will recognize that changes may be made in form and detail without departing from the spirit and scope of the invention. In some embodiments the present invention includes compensating the calculated line pressure based upon the applied differential pressure. As used herein, the "primary" electrodes and capacitors and "secondary" electrodes and capacitors can be alternatively referred to as "primary" and "secondary", respectively.

The measured or calculated line pressure can be used independently, or can be used to, for example, compensate for errors in the measured differential pressure. It is contemplated that the measured line pressure can be used for other purposes.

What is claimed is:

1. A pressure sensor assembly for sensing a pressure of a process fluid, comprising:

a sensor body having a cavity formed therein, the cavity configured to couple to a process fluid pressure and change in size in response to the process fluid pressure;

a deflectable diaphragm in the cavity configured to deflect in response to the first process fluid pressure;

a primary electrode coupled to a wall of the cavity to form a primary capacitor between the primary electrode and the deflectable diaphragm;

a secondary electrode coupled to the wall of the cavity to form a secondary capacitor between the secondary electrode and the deflectable diaphragm; and circuitry coupled to the primary capacitor and the secondary capacitor configured to calculate a line pressure of the process fluid as a function of variation in at least the primary capacitor and the secondary capacitor due to change in the size of the cavity from the process fluid pressure.

2. The apparatus of claim 1 wherein the secondary electrode comprises at least a partial ring.

3. The apparatus of claim 1 wherein the deflectable diaphragm is disc shaped.

4. The apparatus of claim 1 wherein the primary electrode comprises a center electrode.

5. The apparatus of claim 1 wherein the cavity of the sensor body is configured to couple to a second process fluid pressure and further including a second primary electrode arranged on the wall of the cavity opposite the primary electrode relative to the deflectable diaphragm, and wherein the circuitry is further configured to measure a differential pressure applied to opposed sides of the deflectable diaphragm by the first and second process fluid pressures.

6. The apparatus of claim 5 wherein the differential pressure measurement is compensated based on the calculated line pressure.

7. The apparatus of claim 1 wherein the cavity of the sensor body is configured to couple to a second process fluid pressure and further including a second primary electrode and a second secondary electrode coupled to a wall of the cavity opposite the primary electrode and the secondary electrode relative to the diaphragm, to thereby form a second primary capacitor between the second primary electrode and the deflectable diaphragm and a second secondary capacitor between the second secondary electrode and the deflectable diaphragm.

8. The apparatus of claim 7 wherein the circuitry is coupled to the first and second primary and secondary capacitors and determines line pressure as:

$LP=k*(1/Rx+1/Ry)/(1/Mx+1/My)$ wherein $M_x$ is a capacitance of the primary capacitor
k is a constant
$M_y$ is a capacitance of the second primary capacitor
$R_x$ is a capacitance of the secondary capacitor, and
$R_y$ is a capacitance of the second secondary capacitor.

9. The apparatus of claim 7 wherein the circuitry is coupled to the first and second primary and secondary capacitors and determines line pressure as:

$LP=j*(Mx/Rx+My/Ry)$ wherein $M_x$ is a capacitance of the primary capacitor
j is a constant
$M_y$ is a capacitance of the second primary capacitor
$R_x$ is a capacitance of the secondary capacitor, and
$R_y$ is a capacitance of the second secondary capacitor.

10. The apparatus of claim 1 wherein the sensor body is formed of a rigid insulator comprising ceramic or glass.

11. A process transmitter for measuring pressure of the process fluid including the pressure sensor of claim 1.

12. A method of determining a line pressure of a process fluid, comprising:
applying a pressure of the process fluid to a sensor body having a cavity formed therein and responsively causing a size of the cavity to change, the cavity including a deflectable diaphragm and a primary electrode which forms a primary capacitor with the diaphragm, the sensor body further including a secondary electrode forming a secondary capacitor with a cavity;
calculating the line pressure of the process fluid as a function of variation in at least the primary capacitor and the secondary capacitor due to change in the size of the cavity in response to the process fluid pressure.

13. The method of claim 12 wherein the cavity of the sensor body is configured to couple to a second process fluid pressure and further including a second primary electrode arranged on the wall of the cavity opposite the primary electrode relative to the deflectable diaphragm, and further including measuring a differential pressure applied to opposed sides of the deflectable diaphragm by the first and second process pressures.

14. The method of claim 12 including compensating the differential pressure based upon the calculated line pressure.

15. The method of claim 12 including a second primary electrode and a second secondary electrode coupled to a wall of the cavity opposite the primary electrode and the secondary electrode relative to the diaphragm, to thereby form a second primary capacitor between the second primary electrode and the deflectable diaphragm and a second secondary capacitor between the second secondary electrode and the deflectable diaphragm.

16. The method of claim 15 wherein calculating line pressure is determined by the equation:

$LP=k*(1/Rx+1/Ry)/(1/Mx+1/My)$ wherein $M_x$ is a capacitance of the primary capacitor
k is a constant
$M_y$ is a capacitance of the second primary capacitor
$R_x$ is a capacitance of the secondary capacitor, and
$R_y$ is a capacitance of the second secondary capacitor.

17. The method of claim 12 wherein calculating line pressure is determined by the equation:

$j*(Mx/Ry+Mx/Ry)$ wherein $M_x$ is a capacitance of the primary capacitor
j is a constant
$M_y$ is a capacitance of the second primary capacitor
$R_x$ is a capacitance of the secondary capacitor, and
$R_y$ is a capacitance of the second secondary capacitor.

18. The method of claim 12 wherein the sensor body is formed of a rigid insulator comprising ceramic or glass.

19. A process transmitter for measuring pressure of the process fluid configured to carrying out the method of claim 12.

20. A pressure sensor comprising;
a deflectable diaphragm configured to receive first and second pressures applied to opposing sides;
first and second primary electrodes configured to form first and second primary capacitors with the deflectable diaphragm;
first and second secondary electrodes configured to form first and second secondary capacitors with the deflectable diaphragm;
circuitry configured to calculate differential pressure and further configured to calculate line pressure as a function of variations in the first and second primary capacitors and first and second secondary capacitors.

21. The pressure sensor of claim 20 wherein the circuitry is further configured to compensate differential pressure based upon the calculated line pressure.

22. The pressure sensor of claim 20 wherein the circuitry determines line pressure as:

$LP=k*(1/Rx+1/Ry)/(1/Mx+1/My)$ wherein $M_x$ is a capacitance of the primary capacitor
k is a constant
$M_y$ is a capacitance of the second primary capacitor
$R_x$ is a capacitance of the secondary capacitor, and
$R_y$ is a capacitance of the second secondary capacitor.

23. The pressure sensor of claim 20 wherein the circuitry determines line pressure as:

$LP=j*(Mx/Rx+My/Ry)$ wherein $M_x$ is a capacitance of the primary capacitor
j is a constant
$M_y$ is a capacitance of the second primary capacitor
$R_x$ is a capacitance of the secondary capacitor, and
$R_y$ is a capacitance of the second secondary capacitor.

24. The pressure sensor of claim 20 including a temperature sensor and wherein the circuitry is further configured to calculate mass flow as a function of a differential pressure, line pressure and temperature.

25. The pressure sensor of claim 20 wherein the deflectable diaphragm is positioned in a cavity which changes in size in response to applied pressure.

* * * * *

UNITED STATES PATENT AND TRADEMARK OFFICE
CERTIFICATE OF CORRECTION

PATENT NO. : 7,334,484 B2  Page 1 of 1
APPLICATION NO. : 11/140681
DATED : February 26, 2008
INVENTOR(S) : Donald E. Haraysn and Charles R. Willcox It is certified that error appears in the above-identified patent and that said Letters Patent is hereby corrected as shown below:

Col. 7, line 47, change "$j * (Mx / Ry + Mx / Ry)$" to -- $j * (Mx / Rx + My / Ry)$ --.

Signed and Sealed this

Nineteenth Day of May, 2009

JOHN DOLL
*Acting Director of the United States Patent and Trademark Office*